(12) United States Patent
Baehrle-Miller et al.

(10) Patent No.: US 9,616,864 B2
(45) Date of Patent: Apr. 11, 2017

(54) METHOD AND DEVICE FOR OPERATING A BRAKING DEVICE, BRAKING DEVICE

(71) Applicant: Robert Bosch GmbH, Stuttgart (DE)

(72) Inventors: Frank Baehrle-Miller, Schoenaich (DE); Tobias Putzer, Bad Friedrichshall (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 14/975,956

(22) Filed: Dec. 21, 2015

(65) Prior Publication Data

US 2016/0176389 A1 Jun. 23, 2016

(30) Foreign Application Priority Data

Dec. 22, 2014 (DE) .................. 10 2014 226 856

(51) Int. Cl.
*F16D 121/26* (2012.01)
*B60T 8/172* (2006.01)
*B60T 8/171* (2006.01)
*B60T 13/74* (2006.01)
*F16D 55/226* (2006.01)
*F16D 65/18* (2006.01)
*B60T 8/88* (2006.01)
*F16D 121/04* (2012.01)
(Continued)

(52) U.S. Cl.
CPC ............. *B60T 8/172* (2013.01); *B60T 8/171* (2013.01); *B60T 8/885* (2013.01); *B60T 13/741* (2013.01); *F16D 55/226* (2013.01); *F16D 65/183* (2013.01); *B60T 2270/413* (2013.01); *F16D 2121/04* (2013.01); *F16D 2121/24* (2013.01); *F16D 2125/40* (2013.01)

(58) Field of Classification Search
USPC .......... 701/70, 71, 78, 82, 83; 188/156, 157, 188/158, 159, 160, 161, 162, 163, 164
See application file for complete search history.

(56) References Cited

U.S. PATENT DOCUMENTS

2002/0100647 A1* 8/2002 Miyakawa .............. B60T 13/02
188/162
2004/0011579 A1* 1/2004 Heckmann .............. B60T 7/042
180/271
(Continued)

*Primary Examiner* — Thomas Tarcza
*Assistant Examiner* — Richard Goldman
(74) *Attorney, Agent, or Firm* — Maginot, Moore & Beck LLP

(57) ABSTRACT

A method for operating a wheel braking device having an electrically motorized actuator, wherein the actuator comprises an electric motor and an actuator element that can be moved by means of the electric motor. The actuator element is moved into a brake application position to actuate the wheel braking device and moved into a brake release position to release the wheel braking device. A movement travel of the actuator element is monitored while releasing the wheel braking device. The electric motor is switched from a control operation into a free-running operation during a release process and a free-running voltage is determined and that a minimum duration of movement of the actuator element for achieving the release position is calculated based upon the determined free-running voltage and is compared with a measured duration of movement of the actuator element to perform a plausibility check of the movement travel.

8 Claims, 3 Drawing Sheets

(51) Int. Cl.
  *F16D 121/24* (2012.01)
  *F16D 125/40* (2012.01)

(56) References Cited

U.S. PATENT DOCUMENTS

| | | | |
|---|---|---|---|
| 2010/0299035 A1* | 11/2010 | Maron | B60T 13/746 701/70 |
| 2011/0017554 A1* | 1/2011 | Baehrle-Miller | B60T 7/12 188/72.1 |
| 2011/0278108 A1* | 11/2011 | Watanabe | B60T 7/042 188/72.3 |
| 2013/0116904 A1* | 5/2013 | Watanabe | B60T 8/4872 701/70 |
| 2013/0162010 A1* | 6/2013 | Koyama | B60T 13/142 303/6.01 |
| 2016/0017942 A1* | 1/2016 | Kwon | F16D 65/18 188/162 |
| 2016/0025169 A1* | 1/2016 | Holder | F16D 65/18 188/162 |
| 2016/0176388 A1* | 6/2016 | Baehrle-Miller | B60T 8/171 701/70 |
| 2016/0176389 A1* | 6/2016 | Baehrle-Miller | B60T 8/171 701/70 |
| 2016/0200294 A1* | 7/2016 | Takeo | B60T 13/741 188/156 |
| 2016/0244035 A1* | 8/2016 | Yasui | B60T 7/122 |
| 2016/0272176 A1* | 9/2016 | Furuyama | B60T 8/17616 |
| 2016/0339888 A1* | 11/2016 | Yokoyama | B60T 7/042 |

* cited by examiner

METHOD AND DEVICE FOR OPERATING A BRAKING DEVICE, BRAKING DEVICE

This application claims priority under 35 U.S.C. §119 to application no. DE 10 2014 226 856.7, filed on Dec. 22, 2014 in Germany, the disclosure of which is incorporated herein by reference in its entirety.

BACKGROUND

The disclosure relates to a method for operating a braking device, in particular a parking-brake device, of a vehicle, said device comprising at least one wheel braking device having an electrically motorized actuator, wherein the actuator comprises an electric motor and an actuator element that can be moved by means of the electric motor, wherein the actuator element can be moved into a brake application position so as to actuate the wheel braking device and can be moved into a brake release position so as to release the wheel braking device, and wherein a movement travel of the actuator element is monitored at least when releasing the wheel braking device.

In addition, the disclosure relates to a device for operating a braking device of this type, and also a braking device.

Methods and devices and also braking devices of the type mentioned in the introduction are known from the prior art. A wheel of a vehicle is blocked or released by means of an electrically motorized actuator in the case of a parking brake by means of a wheel braking device. For this purpose, an actuator element is displaced into a brake application position in which typically brake linings of the wheel braking device are pressed against a brake disk that is connected to a wheel of the vehicle in a non-rotatable manner, or said actuator element is displaced into a brake release position in which the actuator element is moved backwards to such an extent that the brake disk can move freely between the brake linings. Modern actuators for parking-brake devices of this type are used without rotational speed sensors for reasons of cost and the installation space required. For this reason, an estimation of travel can be performed merely by way of the supply voltage and the motor current so as to correctly position the actuator element. The estimation of travel is required so as to set the correct free play, in other words the spacing between the brake linings and the brake disk, when releasing the braking device. The correct free play is particularly important for a safe driving operation; a free play that is not properly set can lead by way of example to premature wear and tear and is therefore to be avoided.

SUMMARY

The method in accordance with the disclosure has the advantage that the function of the estimation of travel is checked regarding its plausibility on the basis of a required release time or duration of movement. An estimation of travel for achieving the brake release position is checked regarding its plausibility or achieved using the simplest means. In accordance with the disclosure, it is provided for this purpose that the electric motor is switched from a control operation into a free-running operation during a release process and a free-running voltage that is then generated by the electric motor is determined and that a minimum duration of movement of the actuator element for achieving the release position is calculated in dependence upon the determined free-running voltage and is compared with a measured duration of movement until the termination of the release process so as to perform a check regarding the plausibility of the movement travel.

Whether the actuator element has achieved the brake release position is consequently not determined by means of rotational speed sensors or travel measuring sensors, but rather is checked regarding its plausibility by means of time information. The rotational speed or the free-running rotational speed of the electric motor can be determined in dependence upon the free-running voltage of the electric motor. With the knowledge of the standard gear indexes of the electric motor, such as in particular a transmission ratio of the electric motor, it is consequently possible to determine the prevailing movement speed of the actuator element. The required duration of time in which it is necessary for the actuator element to move in order to achieve a minimum release travel is then calculated in dependence upon the prevailing movement speed. This minimum movement duration is then accordingly compared with the actual movement duration of the release process. The latter is measured after the point in time in which the actuator is controlled in order to release the braking device. Consequently, it is possible in a simple manner to identify whether the brake release position has been achieved or not achieved by the actuator element. The measured duration of movement preferably begins with controlling the actuator, in other words at the start of the release process, and ends with achieving the brake application position or by terminating/ending the release process. The measured duration of movement also determines the time in which the control operation is switched into the free-running operation. Expediently, this is taken into account when comparing the measured duration of movement with the calculated duration of movement, in particular if, after determining the free-running voltage, the free-running operation is switched back into the control operation. In accordance with an alternative embodiment of the disclosure, it is preferably provided that the measured duration of movement starts with switching back into the control operation and ends when the brake application position is achieved, wherein it is then likewise preferred that the calculated minimum duration of movement is determined by switching back into the control operation until achieving the brake application position so that a direct comparison of the prevailing duration of movement and the minimum duration of movement can be performed in a simple manner. In particular, it is understood that the free-running operation is only selected temporarily so as to determine the free-running voltage, wherein the electric motor still continues to rotate during the free-running operation, whereby finally, on the one hand, the free-running voltage is induced and, on the other hand, the actuator element continues to move so that the temporary switch into the free-running operation, in other words the duration of the free-running operation, is negligible for the measured and the calculated duration of movement.

In accordance with an advantageous further development of the disclosure, it is provided that the electric motor is switched back into the control operation after calculating the minimum duration of movement. Consequently, the electric motor is only temporarily switched from the control operation into the free-running operation. During the free-running operation, a power output stage that controls the electric motor is transferred into a highly resistive state, so that current no longer flows through the electric motor and the output stage. The free-running voltage can be measured shortly after setting the free-running operation. It is preferred that the free-running voltage is determined only after a decay time of by way of example 10 ms. As soon as the voltage has been measured, it is possible to switch back into the control operation. It is preferred therefore that the electric motor is switched back into the control operation after determining the free-running voltage. The calculation of the minimum duration of movement can then also be performed or terminated during the control operation that has been reset.

In accordance with an advantageous further development of the disclosure in addition it is provided that the electric motor is controlled so as to release the wheel braking device if the measured duration of movement is below the minimum duration of movement. In particular, it is provided that the electric motor is controlled for such a length of time that the measured duration of movement has at least achieved the minimum duration of movement. As a consequence, it is ensured that the actuator element is safely and reliably displaced into the brake release position.

Furthermore, it is preferred that alternatively or in addition thereto an error message is output if the measured duration of movement is below the minimum duration of movement. By way of example, a driver of the vehicle that comprises the braking device, in particular a motor vehicle, is made aware as a result of the error warning that a free play of one of the wheel braking devices of his vehicle is not correctly set and where necessary should be tested in a workshop.

In accordance with an advantageous further development of the disclosure, it is provided that the minimum duration of movement is calculated in dependence upon an estimated or assumed motor constant. For this purpose, by way of example, the value of the motor constant is drawn from a data sheet of the electric motor. It is preferred that the value of the motor constant is adjusted during operation of the electric motor. Where necessary, a method for calculating the motor constant can be provided and the motor constant can be estimated by means of said method. The term "estimation" is in particular to be understood to mean determining a parameter on the basis of measured data, with the "assumption" of software parameterization (non-adaptive).

Furthermore, it is preferably provided that the electric motor is controlled so as to release the wheel braking device—as previously mentioned—in dependence upon a desired release travel. It is possible in a simple manner by means of checking the plausibility of the control process of the electric motor to establish whether an actual release travel of the actuator element has achieved the desired release travel by means of the calculated and actual duration of movement.

The device in accordance with the disclosure having the features of one embodiment is characterized by virtue of a control device that implements the method in accordance with the disclosure. In particular, the control device comprises a voltage measuring device that is connected to the electric motor in order to determine the free-running voltage of the electric motor. As a consequence, the previously mentioned advantages are provided.

The braking device in accordance with the disclosure having the features of one embodiment is characterized by virtue of the device in accordance with the disclosure. As a consequence, the previously mentioned advantages are provided.

BRIEF DESCRIPTION OF THE DRAWINGS

Exemplary embodiments of the disclosure are presented in the drawings an are explained in more detail in the description below.

In the drawings.

DETAILED DESCRIPTION

Figure 1:
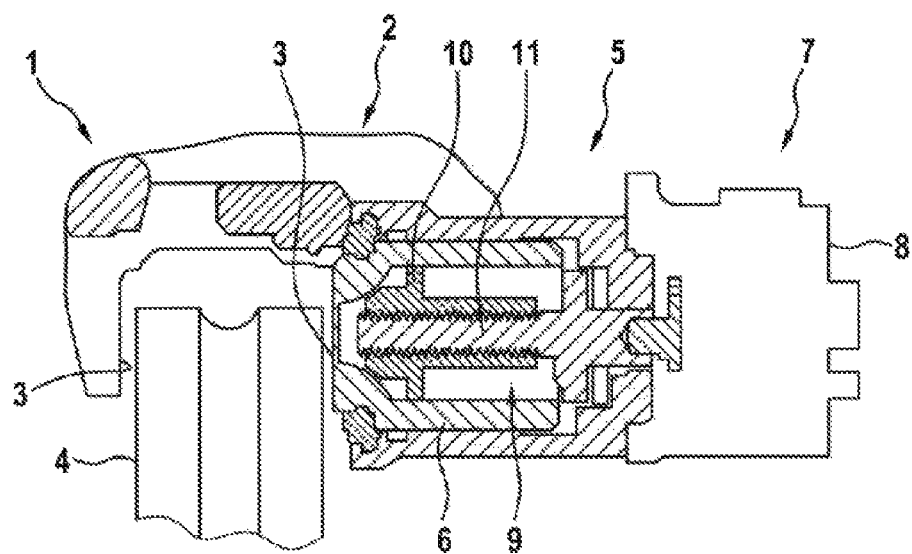
FIG. 1 illustrates a wheel braking device in a simplified sectional view.

FIG. 1 illustrates a simplified sectional view of a wheel braking device 1 of a braking device of a motor vehicle that is not further illustrated. The wheel braking device 1 is embodied as a disk brake and for this purpose comprises a brake caliper 2 that supports brake linings 3, between which brake linings 3 it is possible to clamp a brake disk 4 that is connected in a non-rotatable manner to a wheel of the motor vehicle. For this purpose, the brake caliper 2 is allocated an actuator 5 that comprises a brake piston 6 that can be actuated in a hydraulic manner in order to clamp the brake disk 4 as required between the brake linings 3.

In addition, the wheel braking device 1 is equipped so as to be able to function as a parking brake. In addition, the wheel braking device 1 comprises for this purpose an electrically motorized actuator 7. This is formed from an electric motor 8, an actuator gearing mechanism 9 and an actuator element 10. An output shaft of the electric motor is connected to the actuator gearing mechanism 9. Said actuator gearing mechanism is formed by a drive spindle 11 that is connected in a non-rotatable manner to the output shaft and comprises an outer thread that cooperates with an inner thread of the actuator element 10 that can be displaced along the drive spindle 11. Consequently, the drive spindle 11 is set into a rotational movement by means of controlling the electric motor 8 in order to displace the actuator element 10. The actuator element 10 can be displaced from a brake release position into a brake application position in which the actuator element 10 urges the brake piston 6 against the brake disk 4 and as a consequence applies force to the brake caliper 2. The actuator element 10 is arranged for this purpose in a coaxial manner with respect to the brake piston 6 and within the brake piston 6. In this respect, the wheel braking device 1 corresponds to a conventional combined wheel braking/parking-brake device.

In order to release the parking brake, the electric motor 8 is controlled in order to displace the actuator element 10 from the brake application position into the brake release position so that a free play is set between brake linings 3 and brake disk 4. In order to ensure that the correct free play is set, the method described hereinunder is provided, said method being implemented by a control device that is allocated to the braking device or the braking system. The movement travel of the actuator element 10 is estimated or is checked regarding its plausibility in dependence upon a required duration of movement by means of the method. For this purpose, an actual duration of movement, in other words the time in which the actuator element 10 is displaced, is compared to a minimum duration of movement for the purpose of performing a check regarding its plausibility.

Figure 2:
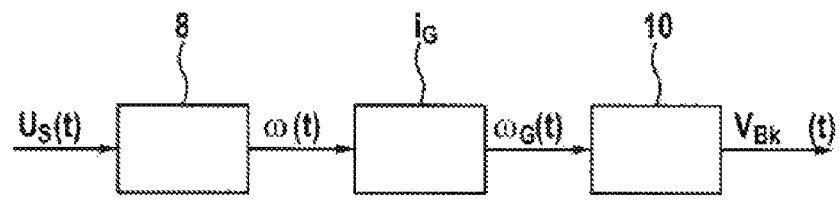
FIG. 2 illustrates a process chain of the wheel braking device as a flow diagram.

The control of the actuator 7 is summarized in FIG. 2 in a flow diagram. The electric motor 8 is operated in dependence upon an operating voltage $U_S(t)$ that is provided by a power output stage. As a consequence, the output shaft of the electric motor 8 is operating at an angular velocity of $\omega(t)$.

The drive spindle 11 is driven at a resultant angular velocity $\omega_G(t)$, said drive spindle preferably being connected by way of a reduction gear in particular in a non-rotatable manner to the rotor or the output shaft of the electric motor 8. The rotary movement is converted by means of the thread toothing of the drive spindle 11 with the actuator element 10 into a translational movement of the actuator element 10 that moves at a velocity $v_{BK}(t)$.

Figure 3:
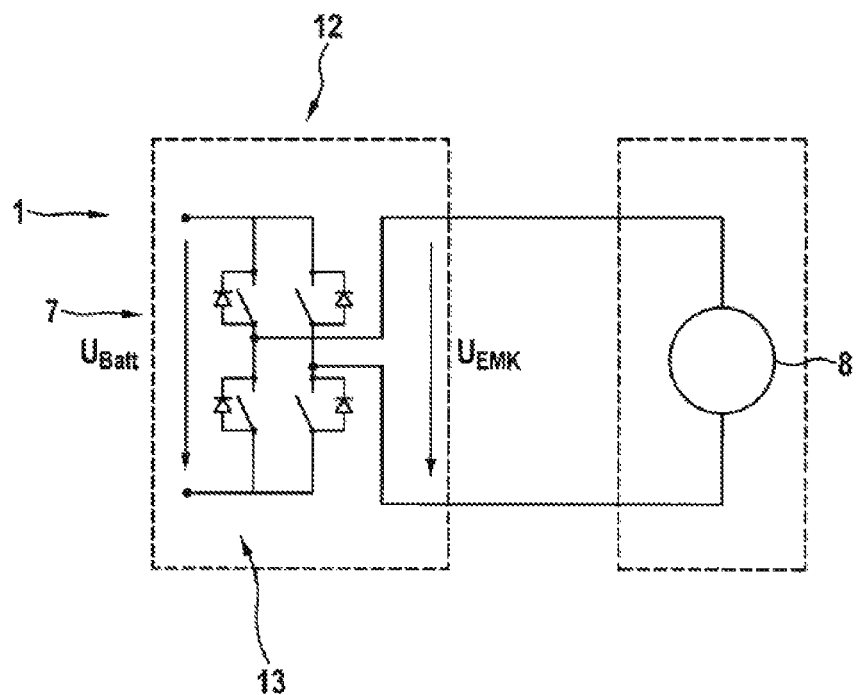
FIG. 3 illustrates a device for controlling the wheel braking device in a simplified illustration.

A power electronics system 12 is provided for controlling the electric motor 8. FIG. 3 illustrates for this purpose in a simplified illustration the electric motor 8 and the power electronics system 12. In the present case, the electric motor 8 is embodied as a two-phase electric motor 8, wherein naturally also a three-phase embodiment or a multiphase embodiment of the electric motor 8 and the power output stage 12 is possible. The power output stage 12 comprises a bridging circuit 13 for operating the phases of the electric motor 8. The power electronics system 12 is connected to an electrical storage device or another energy source so that a supply voltage $U_{Batt}$ is available to said power electronics system. The electric motor 8 is controlled by means of actuating switching elements, in particular semiconductor switching elements, of the bridging circuit 13 in order to drive the drive spindle 11 in the one or in the other direction in order to displace the actuator element 10 into the brake application position or into the brake release position. When releasing the wheel braking device 1 or when displacing the actuator element 10 into the release position, the required motor current is significantly less than when applying the brake. When setting the amount of free play, the motor current is almost continuously in an idle current range and therefore on the low threshold of the measuring range. Since the tolerance position is disadvantageous on the low threshold of the measuring region, the following process is performed in order to determine the position of the actuator element 11 in dependence upon the measured current.

Initially, a so-called free-running control of the electric motor 8 is necessary. For this purpose, the power output stage 12 of the electric motor 8 is transferred into a highly resistive state so that current no longer flows through the electric motor 8 and the power output stage 12 as is illustrated in FIG. 3. If the electric motor 8 further rotates in this state, said electric motor is thus in a generator mode since said electric motor induces a free-running voltage $U_{EMK}$ that can be measured at voltage measuring sites, as is illustrated in FIG. 3. The generator free-running voltage is proportional to the motor rotational speed and follows the mathematical relationship:

$$U_{EMK}(t) = K_M * \omega(t) \quad (1)$$

$K_M$ represents the motor constant of the electric motor 8 and $\omega$ represents the angular velocity of the output shaft of the electric motor 8. If the electric motor 8 is in the generator mode, in addition the following equation applies:

$$U_{Mot}(t) = U_{EMK}(t) \quad (2)$$

The angular velocity $\omega$ of the motor armature or the drive spindle 11 can be calculated as follows from equation (1):

$$\omega(t) = \frac{U_{EMK}(t)}{K_M} \quad (3)$$

It is possible to conclude the movement travel of the actuator element 10 by means of the angular velocity $\omega$ of the motor armature or the drive spindle 11 with the knowledge of the gear ratio $i_G$. In this case the following equation applies:

$$v_{BK}(t) = \frac{\omega(t) * S_{SP}}{2 * \pi * i_G} \quad (4)$$

Wherein $v_{BK}$ represents the movement speed of the actuator element 10, $S_{Sp}$ represents the pitch of the thread of the drive spindle 11 and $i_G$ represents the gear ratio of the gear mechanism 9. In order to open or to release the parking brake or the wheel braking device 1 in a functional manner, a minimum travel of the actuator element 10 is necessary so that said actuator element 10 is moved from the brake application position into the release position. This desired travel $s_{App}$ is predetermined or known in the control logic of the braking system. Using the movement speed and the required release travel, it is possible as follows to calculate a duration of time $T_{App}$ that is required for the release process in order to ensure a desired free play.

$$T_{App} = \frac{s_{App}}{v_{Bk}} \quad (5)$$

It is possible by means of using the equation (3) in equation (4) and subsequently in equation (5) to calculate the required duration of release that in this respect represents a minimum duration of movement for the actuator element 10 for achieving the brake release position with the desired free play for the prevailing situation that by way of example is dependent upon a voltage level, an operating temperature or the like as follows:

$$T_{App} = \frac{2 * \pi * i_G * s_{App} * K_M}{s_{SP} * U_{EMK}} \quad (6)$$

Since the prevailing motor constant $K_M$ is not known but a robust method is to be implemented, a data sheet value $K_{M\_Data}$ of the electric motor 8 is used, said data sheet value in this respect representing an estimated variable. The motor constant can change over time as a result of the operation and aging of the actuator 7. In particular, the motor constant can become smaller as a result of abrasion. A smaller motor constant in turn leads to a more rapid release process since the electric motor 8 namely becomes weaker but also quicker. This can be taken into account in the method by way of example by virtue of the fact that the motor constant is regularly adjusted, by way of example in dependence upon the number of operating cycles. All other parameters are known or established in a constructive manner. The voltage $U_{EMK}$ that is generated by the electric motor 8 in the free-running operation can be measured shortly after switching into the free-running control process. However, it is preferred that the measurement is only started after a decay time of 5 to 15 ms, in particular 10 ms. Owing to an inductive term of the motor differential equation, a large voltage $U_{ind}$ is induced as a result of the very rapid drop of the idle running current, said large voltage leading to the discharge of the charging carrier in the direction of a lower potential, by way of example by way of a free-running diode:

$$U_{ind}(t) = L\frac{di(t)}{dt} \qquad (7)$$

L represents the inductivity of the windings of the motor armature of the electric motor 8. The decay time preferably corresponds to five times the time constant of the inductivity L:

$$T = \frac{L}{R} \qquad (8)$$

Wherein R is the resistance of the free-running circuit inclusive of the electric motor 8. An estimation of the necessary minimum duration of movement that must be achieved for a release process is produced from equation (6) by means of the assumption made regarding the motor constants $K_{M\_Data}$ and the measured generator voltage $U_{EMK}$. Estimated variables are characterized in the further progression with "^":

$$\hat{T}_{App} = \frac{2 * \pi * i_G * s_{App} * K_{M\_Data}}{s_{Sp} * U_{EMK}} \qquad (9)$$

The following equation must be satisfied for a successful release process or for a safe free play to be set:

$$T_{App} \geq \hat{T}_{App} \qquad (10)$$

This check regarding plausibility of the release process of the wheel braking device 1 is entirely independent of a measured current signal and therefore offers a high and advantageous degree of safety.

Figure 4:
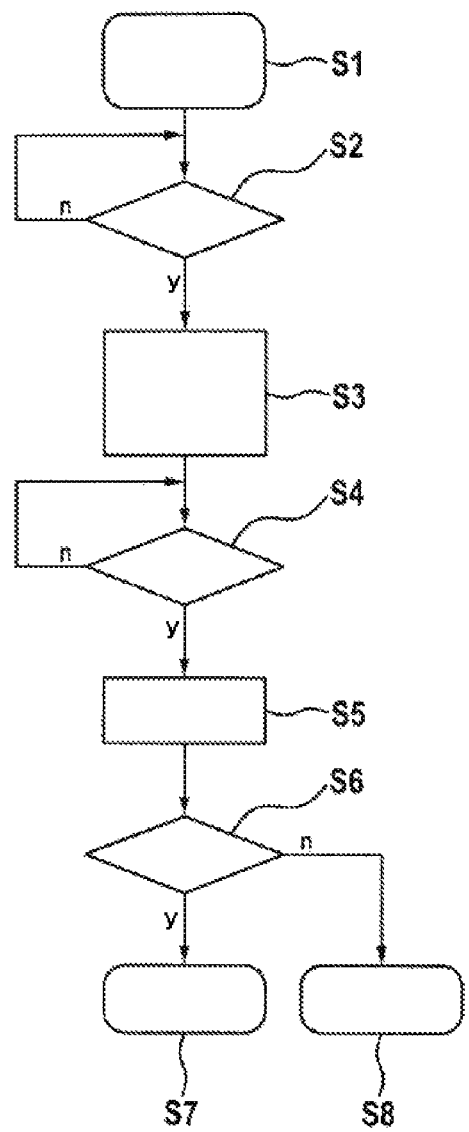
FIG. 4 illustrates an advantageous method for operating the wheel braking device.

FIG. 4 illustrates the previously described method in an application example summarized in a flow diagram. The release process is started in a first step S1 and the electric motor 8 is controlled accordingly so as to move the actuator element 10 from the brake application position into the brake release position.

In step S2, it is subsequently identified whether an idle operation or quasi idle operation of the electric motor 8 has been achieved. If this is the case (y), the electric motor is thus switched from the control operation into the free-running operation in a following step S3. In the free-running operation, the free-running voltage $U_{EMK}$ that is induced by the electric motor that continues to rotate as a result of its inertia is measured and the minimum release duration $\hat{T}_{App}$ is calculated as described above. Where necessary, the electric motor 8 is subsequently switched into the control operation again.

A check is performed in a following step S4 as to whether the desired movement travel of the actuator element 10 has been set. Only if this is the case (y) is the duration of movement $T_{App}$ that is required for achieving the desired release travel calculated in a following step S5. By way of example for this purpose a timer starts to run at the start of the release process, said timer being stopped in step S5 after achieving the desired release travel. The actual required duration of movement is consequently measured. In a following step S6, the measured duration of release is compared with the estimated minimum duration of movement. If the actual duration of movement corresponds to the minimum duration of movement (y), the release process is thus evaluated as successful and in a step S7 by way of example a corresponding signal/display is output. If the actual duration of movement falls below the minimum duration of movement (n), an incorrect release process is identified and a warning is thereby output in a step S8, by way of example to the driver of the motor vehicle.

In the present case, the method is therefore used to monitor the release of the parking brake function of the wheel braking device 1. For this purpose, it is preferred that the idle friction torque of the electrically motorized actuator 7 is included in establishing the minimum duration of movement since this reduces the motor rotational speed, in particular in the free-running operation. This can be achieved by way of a factor λ. This is dependent upon the gradients of the generator voltage:

$$\lambda = f\left(\frac{dU_{EMK}(t)}{dt}\right) \qquad (11)$$

If the gradient is (much) smaller than in the nominal case, it is necessary to assume a reduced idle friction torque and the minimum duration of movement can be shorter.

Alternatively or in addition thereto, it is advantageously provided that the method is also implemented in a functional manner so as to control the wheel braking device 1. It is provided that the duration of the control process that is controlled by the desired travel of the electric motor 8 is extended if the measured duration of movement $\hat{T}_{App}$ is shorter than the estimated minimum duration of movement $\hat{T}_{App}$. In the case of this method, it is not necessary to take into consideration the reduction of the idle torque as this would only lead to a longer release process.

The described method can as a matter of principle be used in all brake systems or vehicles having brake systems having electromechanical parking brakes.

What is claimed is:

1. A method for operating a braking device of a vehicle, the braking device including at least one wheel braking device having an electrically motorized actuator, the electrically motorized actuator having an electric motor and an actuator element, the electric motor being configured to move the actuator element between a brake application position and a brake release position, the actuator element being configured to actuate the at least one wheel braking device when in the brake application position and to release the at least one wheel braking device when in the brake release position, the method comprising:
   monitoring a movement travel of the actuator element at least during a release process;
   switching the electric motor from a control operation into a free-running operation during the release process;
   determining a free-running voltage that is then generated by the electric motor;
   calculating a minimum duration of movement of the actuator element for achieving the release position based upon the determined free-running voltage; and
   performing a plausibility check of the movement travel by comparing the calculated minimum duration of movement of the actuator element to a measured duration of movement of the actuator element until the release process is terminated.

2. The method according to claim 1, further comprising:
   switching the electric motor is switched back into the control operation after calculating the minimum duration of movement.

3. The method according to claim 1, further comprising:
controlling the electric motor to release the wheel braking device in response to the measured duration of movement being less than the minimum duration of movement.

4. The method according to claim 1, further comprising:
outputting an error message is output in response to the measured duration of movement being less than the minimum duration of movement.

5. The method according to claim 1, further comprising:
calculating the minimum duration of movement based upon an assumed motor constant.

6. The method according to claim 1, further comprising:
releasing the wheel breaking device by controlling the electric motor based upon a desired release travel of the actuator element.

7. A device for operating a braking device of a vehicle, the braking device including at least one wheel braking device having an electrically motorized actuator, the electrically motorized actuator having an electric motor and an actuator element, the electric motor being configured to move the actuator element between a brake application position and a brake release position, the actuator element being configured to actuate the at least one wheel braking device when in the brake application position and to release the at least one wheel braking device when in the brake release position, the device comprising:
a controller configured to:
monitor a movement travel of the actuator element at least during a release process;
switch the electric motor from a control operation into a free-running operation during the release process;
determine a free-running voltage that is then generated by the electric motor;
calculate a minimum duration of movement of the actuator element for achieving the release position based upon the determined free-running voltage; and
perform a plausibility check of the movement travel by comparing the calculated minimum duration of movement of the actuator element to a measured duration of movement of the actuator element until the release process is terminated.

8. A braking device comprising:
at least one wheel braking device having an electrically motorized actuator, the electrically motorized actuator having an electric motor and an actuator element, the electric motor being configured to move the actuator element between a brake application position and a brake release position, the actuator element being configured to actuate the at least one wheel braking device when in the brake application position and to release the at least one wheel braking device when in the brake release position; and
a controller configured to:
monitor a movement travel of the actuator element at least during a release process;
switch the electric motor from a control operation into a free-running operation during the release process;
determine a free-running voltage that is then generated by the electric motor;
calculate a minimum duration of movement of the actuator element for achieving the release position based upon the determined free-running voltage; and
perform a plausibility check of the movement travel by comparing the calculated minimum duration of movement of the actuator element to a measured duration of movement of the actuator element until the release process is terminated.

* * * * *